United States Patent
Mathis

(10) Patent No.: US 12,434,320 B2
(45) Date of Patent: Oct. 7, 2025

(54) WELDING DEVICE AND METHOD FOR OPERATING A WELDING DEVICE

(71) Applicant: Alexander Binzel Schweisstechnik GmbH & Co. KG, Buseck (DE)

(72) Inventor: Maximilian Mathis, Gröbenzell (DE)

(73) Assignee: Alexander Binzel Schweisstechnik GmbH & Co. KG, Buseck (DE)

( * ) Notice: Subject to any disclaimer, the term of this patent is extended or adjusted under 35 U.S.C. 154(b) by 947 days.

(21) Appl. No.: 17/605,293

(22) PCT Filed: Apr. 23, 2020

(86) PCT No.: PCT/EP2020/061371
§ 371 (c)(1),
(2) Date: Apr. 27, 2022

(87) PCT Pub. No.: WO2020/216859
PCT Pub. Date: Oct. 29, 2020

(65) Prior Publication Data
US 2022/0258272 A1  Aug. 18, 2022

(30) Foreign Application Priority Data

Apr. 24, 2019 (DE) ..................... 10 2019 002 938.0
Apr. 24, 2019 (DE) ..................... 10 2019 002 939.9

(51) Int. Cl.
*B23K 9/29* (2006.01)
*B23K 9/12* (2006.01)
(Continued)

(52) U.S. Cl.
CPC .............. *B23K 9/295* (2013.01); *B23K 9/121* (2013.01); *B23K 9/133* (2013.01); *B23K 9/173* (2013.01); *B23K 37/0211* (2013.01)

(58) Field of Classification Search
CPC ........ B23K 9/295; B23K 9/121; B23K 9/133; B23K 9/173; B23K 37/0211
See application file for complete search history.

(56) References Cited

U.S. PATENT DOCUMENTS

2006/0070985 A1* 4/2006 Nakabayashi ........... B23K 9/28
219/125.11
2007/0145028 A1  6/2007 Artelsmair

FOREIGN PATENT DOCUMENTS

CN  1757475 A  4/2006
EP  1645353 A2  4/2006
(Continued)

*Primary Examiner* — Brian W Jennison
(74) *Attorney, Agent, or Firm* — Rogowski Law LLC

(57) ABSTRACT

A welding device (1) has a contact tip (2) with an elongated feeding means for feeding a welding wire (4), wherein the contact tip (2) is arranged on or in a nozzle holder (6). A feed device (100) transfers the welding wire (4) from a first orientation into a second orientation, wherein in the first orientation the welding wire (4) is fed to the feed device (100), and in the second orientation the welding wire (4) is led out of the feed device (100) to the nozzle holder (6). A plurality of welding wire cores (8, 10) are introduced into a conduit element (200) via a first conduit element end (202). The welding wire (4) which is guided in the welding wire cores (8, 10) can be guided out of the conduit element (200) via a second conduit element end (204). The welding wire (4) which is guided out of the conduit element (200) via the second conduit element end (204) can be fed into the feed device (100), especially while in the first orientation.

15 Claims, 9 Drawing Sheets

(51) Int. Cl.
 *B23K 9/133* (2006.01)
 *B23K 9/173* (2006.01)
 *B23K 37/02* (2006.01)

(56) References Cited

FOREIGN PATENT DOCUMENTS

| | | |
|---|---|---|
| WO | 02090034 A1 | 11/2002 |
| WO | 2005042201 A1 | 5/2005 |
| WO | 2005056228 A1 | 6/2005 |

* cited by examiner

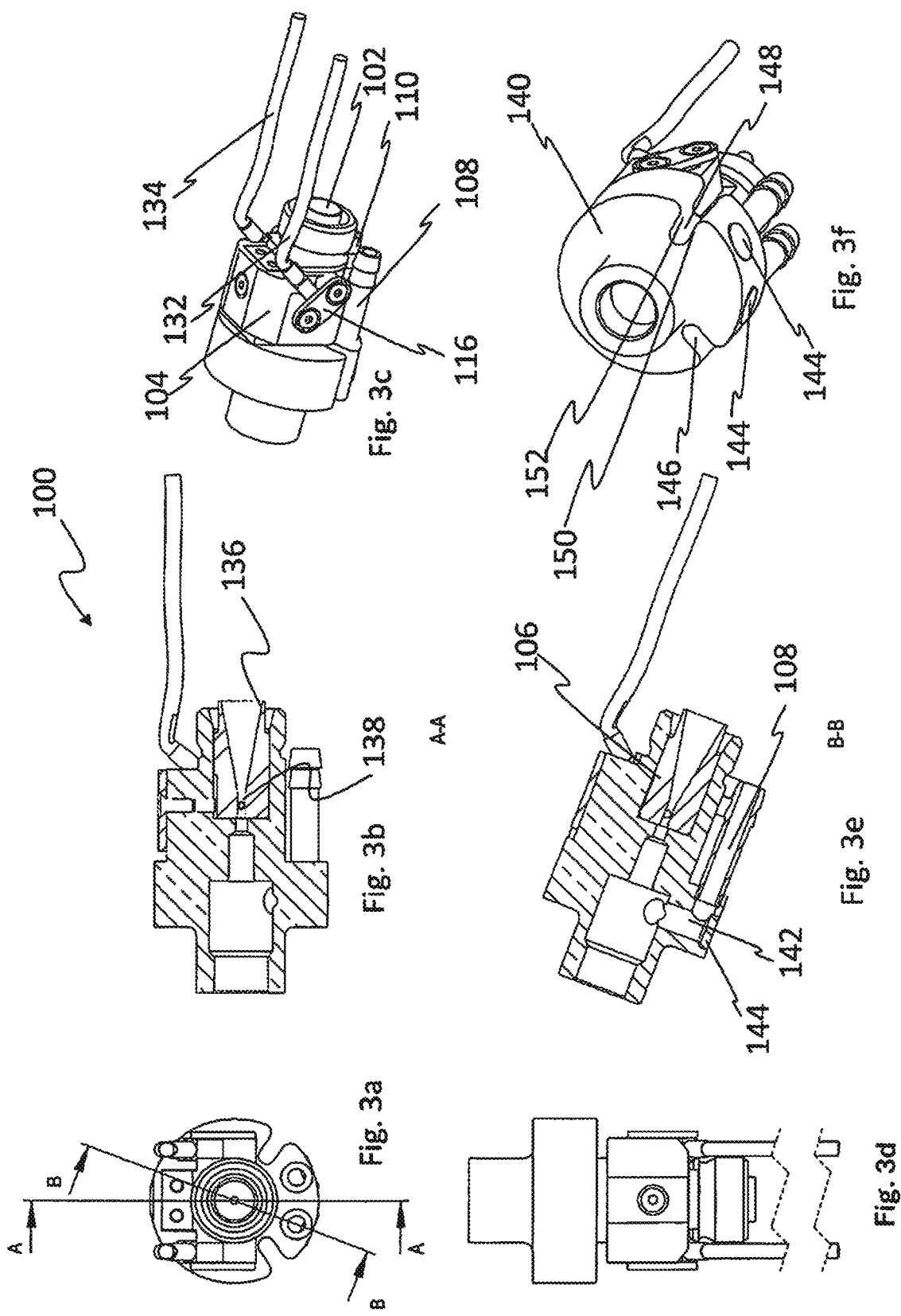

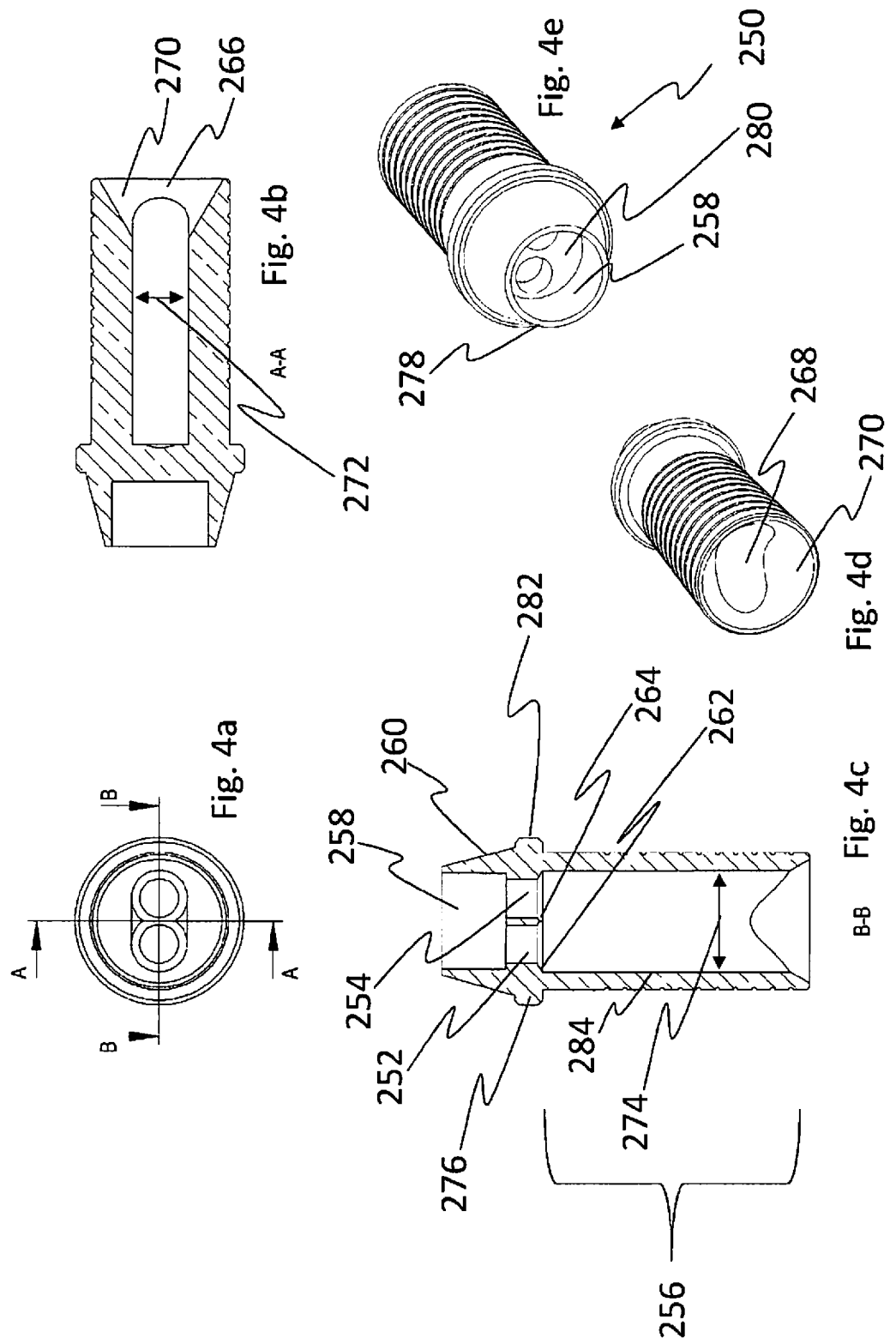

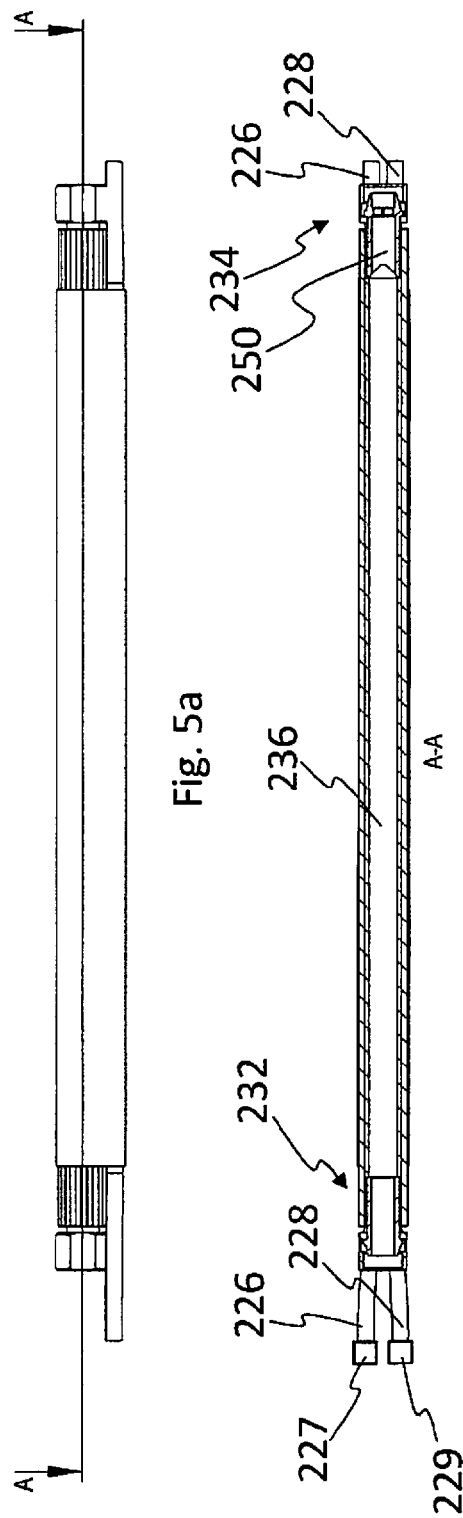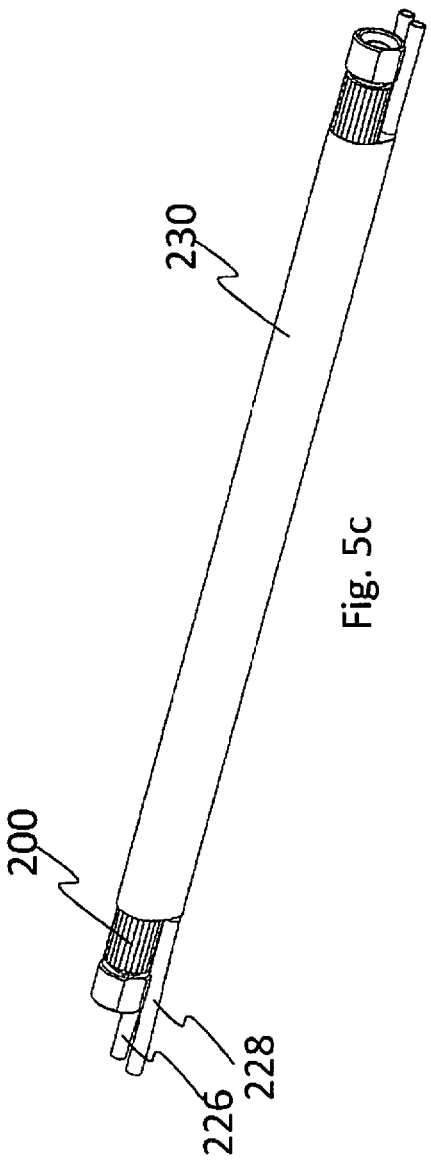

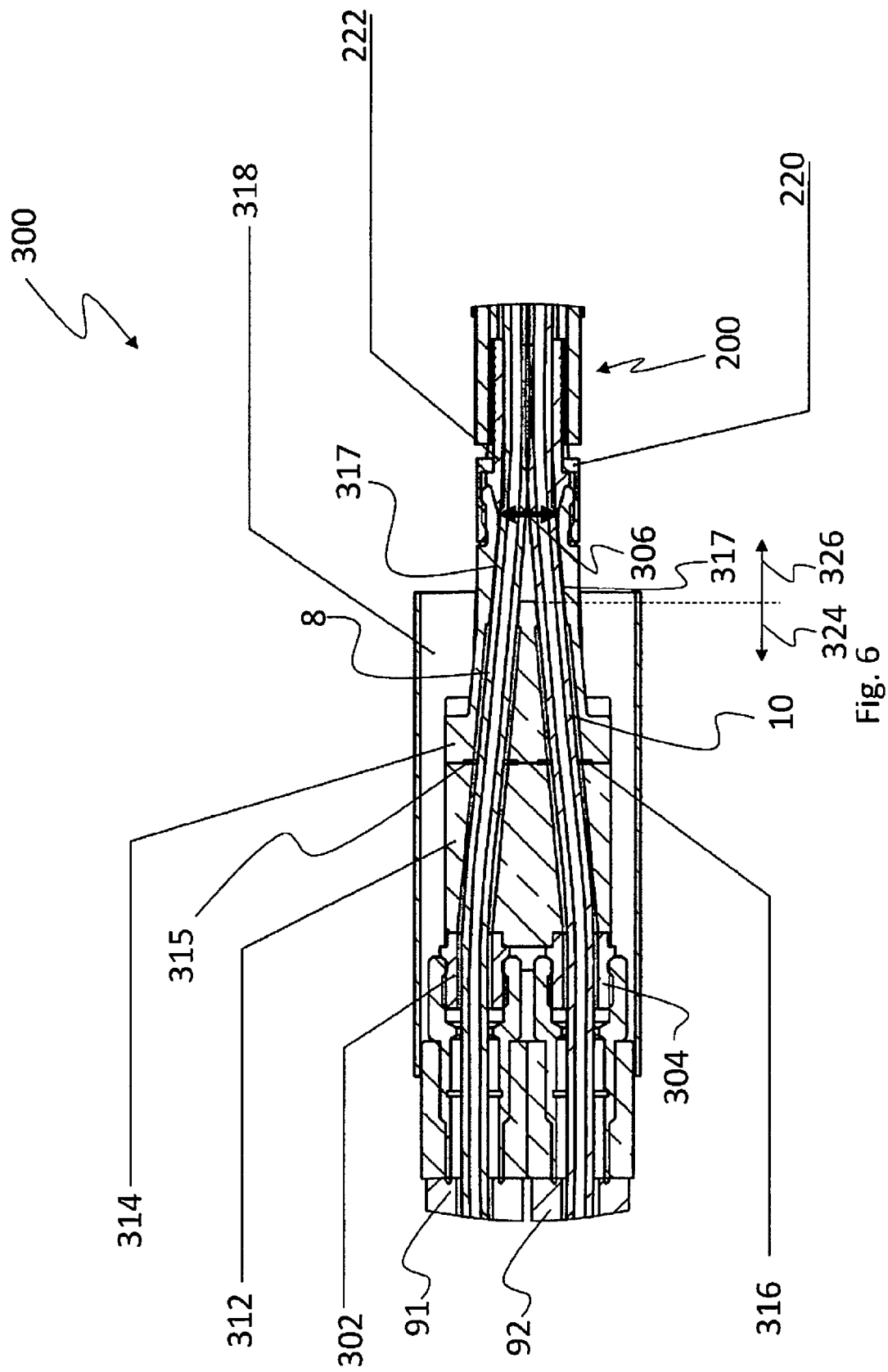

WELDING DEVICE AND METHOD FOR OPERATING A WELDING DEVICE

CROSS-REFERENCE TO RELATED APPLICATIONS

This application is a national stage application (under 35 USC § 371) of PCT/EP2020/061371, filed Apr. 23, 2020, which claims benefit of DE 102019002938.0, filed Apr. 24, 2019 and DE 102019002939.9, filed Apr. 24, 2019, the contents of each of which is incorporated by reference herein.

BACKGROUND OF THE INVENTION

Field and State of the Art

The present invention relates to a welding device, to a multiaxial robot arm and to a method for operating a welding device, as well as to an orbital welding robot.

In many application cases, especially in the automotive industry, components have to be provided with a wide array of weld seams. For this purpose, complex machinery is required and such machinery entails high maintenance and acquisition costs, while also taking up a large surface area.

Before this backdrop, it is an objective of the present invention to put forward an improved or alternative welding device as well as an improved or alternative welding method.

SUMMARY OF THE INVENTION

According to the invention a welding device preferably comprises the following: at least one or precisely one contact tip, wherein the contact tip has an elongated feeding means for feeding a welding wire;
  at least one or precisely one nozzle holder, wherein the contact tip is arranged on or in the nozzle holder.

The welding device can comprise at least one or precisely one alignment means. Here, the nozzle holder can be connected or connectable at least indirectly to the alignment means. The welding wire can preferably be fed all the way through the alignment means into the nozzle holder, especially into the contact tip. The alignment means preferably has an input component and an output component, wherein current and/or working gas can be fed into the alignment means via the input component and wherein the fed-in current or the fed-in working gas can be fed into the nozzle holder and/or wherein the fed-in current or the fed-in working gas can be fed into the nozzle holder via the output component. The output component can be rotatable relative to the input component, especially by an angle of more than or up to 45°, or by more than or up to 90°, or by more than or up to 180°, or by more than or up to 270°, or else by more than or up to 360°. Preferably the output component is connected or can be brought into contact—especially by means of a frictional fit and/or by means of a positive fit—with a hollow shaft, especially of a robot or robot arm or of an orbital welding robot.

Moreover, the welding device can comprise a feeding means for moving the welding wire out of a first orientation and into a second orientation. In this context, the welding wire can be fed into the feeding means while in the first orientation and it can be fed out of the feeding means while in the second orientation. The welding wire can preferably be fed out of the alignment means in the direction of the nozzle holder, in particular in the direction of the feeding means, wherein the feeding means has a preferably conical or curved, especially concave or convex, feeding surface. The feeding means can have or can form at least one base part and one replaceable part, wherein the replaceable part has the conical feeding surface. This is advantageous since the replaceable part is preferably a wearing part. Preferably, one or precisely one or only one welding wire can be arranged between the feeding means and the contact tip. Preferably, the transport path for feeding the welding wire in the feeding means is tapered or restricted or reduced in terms of its opening width by means of the feeding surface in such a way that only fewer than two welding wires, and thus preferably precisely one, welding wire can be arranged in the transport path of the feeding means. In this manner, preferably precisely only one welding wire can extend completely through the feeding means. The feeding means is preferably made, at least partially, by means of a sintering process, especially a laser sintering process or an additive process, in which filaments are employed that contain metal and in which, following an additive step, a sintering step is carried out. In particular, the replaceable part can be manufactured by means of sintering or such a process.

Moreover, the welding device can comprise an elongated conduit element. A plurality of welding wire cores, especially two or precisely two or more than two, can be accommodated by the conduit element. Most preferably, the welding wire cores can be introduced into the conduit element via a first end of the conduit element, wherein the welding wires that are fed into the welding wire cores can preferably be fed out of the conduit element via a second end of the conduit element. Preferably, one or at least one or precisely one stop is provided in order to restrict the penetration depth of the welding wire cores into the conduit element. The stop can be part of an alignment means. The welding wire that is fed out of the conduit element via the second end of the conduit element can preferably be fed in the direction of the feeding means, especially while in the first orientation, into the feeding means. The alignment means preferably forms at least two axial openings. The end of a welding wire core can preferably be arranged in a defined manner in front of an opening, wherein the wire or welding wire that is fed through this welding wire core can be fed through the opening. The end of another welding wire core can preferably be arranged in a defined manner in front of another opening, wherein the other welding wire that is fed through the other welding wire core can be fed through the other opening. The association means preferably forms an association component by means of which the welding wire core can be associated with the one opening, while the other welding wire core can be associated with the other opening.

Moreover, the welding device can have a separating means, especially for purposes of separating the working gas and the welding wire. The separating means preferably has at least two supply means. Preferably, each supply means can accommodate current, working gas and welding wire. The separating means can have several discharging means. The number of discharging means can be greater than the number of supply means.

The welding wires that are fed in via the supply means can preferably be fed out of the separating means via a welding wire discharging means. The working gases fed in via the supply means can preferably be fed out of the separating means via one or more gas outlets. The gas outlets are preferably connected to gas coupling means in order to once again couple the working gases into the transport path of the welding wire or for bypassing the welding wire or for introduction into the same conduit section. The gas coupling means can be integral parts of the alignment means, especially of the input component, or of the feeding means or else of the association means.

Moreover, the welding device can have several source means. Preferably, each source means has a current source, a working gas source and a welding wire source. Preferably, each source means is connected to a supply means via a connecting means. Particularly when it comes to a welding wire, the current source, the working gas source and/or the welding wire source can also be supplied either individually or else in combination, especially by individual supply means or by combined supply means.

In addition or as an alternative, the present invention can relate to a welding device that preferably comprises at least one feeding means for moving the welding wire out of a first orientation and into a second orientation, wherein the welding wire can be fed to the feeding means while in the first orientation, and can be fed out of the feeding means while in the second orientation, in particular in the direction of a nozzle holder or a torch, wherein the feeding means has a preferably conical feeding surface and/or it has an elongated conduit element, wherein a plurality of welding wire cores can be accommodated by the conduit element, wherein the welding wire cores can be introduced into the conduit element via a first end of the conduit element and wherein the welding wire that is fed into the welding wire cores can be fed out of the conduit element via a second end of the conduit element, wherein the welding wire that is fed out of the conduit element via the second end of the conduit element can be fed in the direction of the feeding means or of the torch; it especially enters the feeding means while in the first orientation, and/or it has an alignment means and/or a separating means and/or an association means and/or a conduit element, especially with an association means.

Moreover, the present invention can relate to a feeding means or to a welding device having such a feeding means.

Preferably, the welding device, which comprises a feeding means as set forth in the present invention, likewise comprises at least one or precisely one contact tip and/or at least one or precisely one nozzle holder. In this context, the contact tip here can preferably have an elongated feeding means for feeding a welding wire. Moreover, the contact tip can preferably be arranged on or in the nozzle holder.

Therefore, the welding device preferably comprises a feeding means for moving a welding wire out of a first orientation and into a second orientation. In this context, the welding wire can preferably be fed to the feeding means while in a first orientation and can then preferably be fed out of the feeding means while in a second orientation, in particular in the direction of the nozzle holder, wherein the feeding means has or forms a preferably conical or slanted feeding surface. The feeding surface can preferably be hardened or coated, in particular, the feeding surface preferably has a greater strength and/or hardness than the contact tip does.

Only one or precisely one welding wire can be arranged between the feeding means and the contact tip. This solution is advantageous since only precisely the material of this one welding wire can be employed to create the weld seam. This advantageously ensures that the quality of the weld seam at the appertaining site has the desired material properties.

According to another preferred embodiment, at least one stop is provided in order to restrict the penetration depth of the welding wire core into the conduit element of the present invention. This embodiment is advantageous since, owing to the stop, a relative position can be prescribed between the appertaining welding wire core and the conduit element.

According to another preferred embodiment of the present invention, the stop is part of an association means. In this context, the association means preferably forms at least two or precisely two axial openings. The end of a welding wire core can preferably be arranged in a defined manner in front of an opening, wherein the welding wire that is fed through this welding wire core can be fed via the opening, and the end of another welding wire core can be arranged in a defined manner in front of another opening. The other welding wire that is fed through the other welding wire core can preferably be fed through the other opening. The association means preferably forms an association component by means of which the welding wire core can be associated with the one opening, while the other welding wire core can be associated with the other opening. This embodiment is advantageous since, as a result, the exiting direction of the welding wire out of the appertaining welding wire core can be prescribed, as a result of which mechanical stresses caused by undesired elastic and/or plastic deformations of the welding wire can be reduced or prescribed in a defined manner or else prevented.

An alignment means is provided according to another preferred embodiment of the present invention. Here, the nozzle holder is preferably connected at least indirectly to the alignment means, wherein a welding wire can be fed through the alignment means all the way into the nozzle holder, especially into the contact tip. The alignment means preferably has an input component and/or an output component, wherein current and/or working gas can be fed into the alignment means via the input component and/or the fed-in current or the fed-in working gas can be fed into the nozzle holder via the output component. The output component here can preferably be rotated, especially rotatably mounted, relative to the input component. This embodiment is advantageous since it creates a highly space-saving or compact manner to feed in current and/or gas.

According to another preferred embodiment of the present invention, the feeding means has at least one base part and one replaceable part. Here, the replaceable part preferably has the especially conical feeding surface. This embodiment is advantageous since the replaceable part can be replaced, especially after it has become worn out. Here, the wear and tear can result from the fact that, when one end of the welding wire is introduced into the feeding means, it slides or grinds or scrapes along the preferably conical or slanted feeding surface.

According to another preferred embodiment of the present invention, a separating means is provided. The separating means preferably has at least two or precisely two supply means. Preferably, each supply means can accommodate current, gas and/or welding wire. The welding wires that have been fed via the supply means can preferably be fed out of the separating means via a welding wire discharging means. In addition or as an alternative, the gases fed in via the supply means can be fed out of the separating means via one or more gas outlets. The gas outlets are preferably connected to gas coupling means in order to once again couple the gases into the transport path of the welding wire. The gas coupling means are preferably components of the alignment means, especially of the input component, or of the feeding means or of the association means. According to another preferred embodiment of the present invention, the separating means has several discharging means. The number of discharging means is preferably greater than the number of supply means. This embodiment is advantageous since the gas that is supplied together with an appertaining welding wire can be separated from the welding wire and can thus be conveyed via another path, especially another conduit or conduit connection, especially a pipe or a tube, in the direction of the contact tip.

According to another preferred embodiment of the present invention, several source means are provided, especially at least two or precisely two, wherein each source means has a current source, a working-gas source and/or a welding wire source, wherein each source means is connected to one or at least one supply means via a connecting means. Preferably, the welding wires supplied by the source means differ, especially in terms of their material composition and/or in terms of one or more geometric properties. In addition or as an alternative, the working gases supplied by the appertaining working gas sources can differ, especially in terms of their composition and/or density. In addition or as an alternative, the strength of the current that is generated by the various current sources can differ. This embodiment is advantageous since the welding wires of the various source means can be fed via the same conduit element and the gas or working gas associated with the appertaining welding wire can be transported or conveyed via one conduit that differs from the conduit through which the gas or working gas associated with the other welding wire can be fed or conveyed. In this manner, an advantageous welding wire feed of both or of all of the welding wires is made possible, without this causing an undesired mixing of the gases or working gases.

Moreover, the present invention can relate to a method for operating a welding device that has a feeding means according to the invention.

Furthermore, the present invention can relate to an alignment means or to a welding device having such an alignment means.

Preferably, the welding device that has an alignment means as set forth in the present invention likewise has at least one or precisely one contact tip and/or at least one or precisely one nozzle holder. Here, the contact tip can preferably have an elongated feeding means for feeding a welding wire. Moreover, the contact tip can preferably be arranged on or in the nozzle holder.

The nozzle holder is thus preferably connected at least indirectly to an alignment means. A welding wire can preferably be fed through the alignment means all the way into nozzle holder, especially into a contact tip. The alignment means preferably has an input component and an output component, wherein current and working gas can be fed into the alignment means via the input component and the fed-in current or the fed-in working gas can be fed into the nozzle holder via the output component. The output component here can preferably be rotated, especially rotatably mounted, relative to the input component. This embodiment is advantageous since it creates a highly space-saving or compact manner to feed in current and/or gas.

According to another preferred embodiment of the present invention, the welding device comprises a feeding means for moving the welding wire, especially a first welding wire, out of a first source means and/or a second welding wire out of a second source means, out of a first orientation and into a second orientation. While the welding wire is in the first orientation, it can be fed to the feeding means, and while the welding wire is in the second orientation, it can be fed out of the feeding means, in particular in the direction of the nozzle holder. In this context, the feeding means preferably has a preferably conical or slanted feeding surface. This embodiment is advantageous since, as a result, the welding wire can then be moved, especially automatically, into an orientation with a defined alignment.

Preferably, the feeding means has an opening through which the welding wire can be fed. Preferably, the diameter of the opening is smaller than the sum of the diameters of the welding wires that have been supplied by the source means.

According to another preferred embodiment of the present invention, the welding device has an elongated conduit element. A plurality of welding wire cores, especially two or precisely two, can preferably be accommodated by the conduit element. The welding wire cores can be introduced into the conduit element via a first end of the conduit element, wherein, in each case, the welding wire that is fed into the welding wire cores can be fed via a second end of the conduit element out of the conduit element and preferably out of the appertaining welding wire core. The welding wire that is fed out of the conduit element via the second end of the conduit element can preferably be fed in the direction of the feeding means or it can enter the feeding means while in the first orientation. This embodiment is advantageous since the conduit element can supply several welding wires in a compact and protected manner.

According to a preferred embodiment of the present invention, just one welding wire can be arranged between the feeding means and the contact tip. This embodiment is advantageous since only precisely the material of this one welding wire can be employed to create the weld seam. As a result, this advantageously ensures that the quality of the weld seam at the appertaining site has the desired material properties.

According to another preferred embodiment, at least one stop is provided in order to restrict the penetration depth of the welding wire core into the conduit element of the present invention. This embodiment is advantageous since, owing to the stop, a relative position can be prescribed between the appertaining welding wire core and the conduit element.

According to another preferred embodiment of the present invention, the stop is part of an association means. In this context, the association means preferably forms at least two or precisely two axial openings. The end of a welding wire core can preferably be arranged in a defined manner in front of an opening, wherein the welding wire that is fed through this welding wire core can be fed via the opening, and the end of another welding wire core can be arranged in a defined manner in front of another opening. The other welding wire that is fed through the other welding wire core can preferably be fed through the other opening. The association means preferably forms an association component by means of which the welding wire core can be associated with the one opening, while the other welding wire core can be associated with the other opening. This embodiment is advantageous since, as a result, the exiting direction of the welding wire out of the appertaining welding wire core can be prescribed, as a result of which mechanical stresses caused by undesired elastic and/or plastic deformations of the welding wire can be reduced or prescribed in a defined manner or else prevented.

According to another preferred embodiment of the present invention, the feeding means has at least one base part and one replaceable part. Here, the replaceable part preferably has the especially conical feeding surface. This embodiment is advantageous since the replaceable part can be replaced, especially after it has become worn out. Here, the wear and tear can result from the fact that, when one end of the welding wire is introduced into the feeding means, it slides or grinds or scrapes along the preferably conical or slanted feeding surface.

According to another preferred embodiment of the present invention, a separating means is provided. The separating means preferably has at least two or precisely two supply means. Preferably, each supply means can accommodate current, gas and/or welding wire. The welding wires that have been fed via the supply means can preferably be fed out of the separating means via a welding wire discharging means. In addition or as an alternative, the gases fed in via the supply means can be fed out of the separating means via one or more gas outlets. The gas outlets are preferably connected to gas coupling means in order to once again couple the gases into the transport path of the welding wire. The gas coupling means are preferably components of the alignment means, especially of the input component, or of the feeding means or of the association means. According to another preferred embodiment of the present invention, the separating means has several discharging means. The number of discharging means is preferably greater than the number of supply means. This embodiment is advantageous since the gas that is supplied together with an appertaining welding wire can be separated from the welding wire and can thus be conveyed via another path, especially another conduit or conduit connection, especially a pipe or a tube, in the direction of the contact tip.

According to another preferred embodiment of the present invention, several source means are provided, especially at least two or precisely two, wherein each source means has a current source, a working-gas source and/or a welding wire source, wherein each source means is connected to one or at least one supply means via a connecting means. Preferably, the welding wires supplied by the source means differ, especially in terms of their material composition and/or in terms of one or more geometric properties. In addition or as an alternative, the working gases supplied by the appertaining working gas sources can differ, especially in terms of their composition and/or density. In addition or as an alternative, the strength of the current that is generated by the various current sources can differ. This embodiment is advantageous since the welding wires of the various source means can be fed via the same conduit element and the gas or working gas associated with the appertaining welding wire can be transported or conveyed via one conduit that differs from the conduit through which the gas or working gas associated with the other welding wire can be fed or conveyed. In this manner, an advantageous welding wire feed of both or of all of the welding wires is made possible, without this causing an undesired mixing of the gases or working gases.

Moreover, the present invention can relate to a method for operating a welding device that has an alignment means according to the invention.

Furthermore, the present invention can relate to a separating means or to a welding device having such a separating means.

Preferably, the welding device that has a separating means as set forth in the present invention likewise has at least one or precisely one contact tip and/or at least one or precisely one nozzle holder. Here, the contact tip can preferably have an elongated feeding means for feeding a welding wire. Moreover, the contact tip can preferably be arranged on or in the nozzle holder.

The separating means preferably has at least two or precisely two supply means. Preferably, each supply means can accommodate current, gas and/or welding wire. The welding wires that have been fed via the supply means can preferably be fed out of the separating means via a welding wire discharging means. In addition or as an alternative, the gases fed in via the supply means can be fed out of the separating means via one or more gas outlets. The gas outlets are preferably connected to gas coupling means in order to once again couple the gases into the transport path of the welding wire. The gas coupling means are preferably components of an alignment means, especially of an input component, or of a feeding means or of an association means. According to another preferred embodiment of the present invention, the separating means has several discharging means. The number of discharging means is preferably greater than the number of supply means. This solution is advantageous since the gas that is supplied together with an appertaining welding wire can be separated from the welding wire and can thus be conveyed via another path, especially another conduit or conduit connection, especially a pipe or a tube, in the direction of the contact tip.

According to another preferred embodiment of the present invention, the welding device comprises a feeding means for moving the welding wire, especially a first welding wire, out of a first source means and/or a second welding wire out of a second source means, out of a first orientation and into a second orientation. While the welding wire is in the first orientation, it can be fed to the feeding means, and while the welding wire is in the second orientation, it can be fed out of the feeding means, in particular in the direction of the nozzle holder. In this context, the feeding means preferably has a preferably conical or slanted feeding surface. This embodiment is advantageous since, as a result, the welding wire can then be moved, especially automatically, into an orientation with a defined alignment.

Preferably, the feeding means has an opening through which the welding wire can be fed. Preferably, the diameter of the opening is smaller than the sum of the diameters of the welding wires that have been supplied by the source means.

According to another preferred embodiment of the present invention, the welding device has an elongated conduit element. A plurality of welding wire cores, especially two or precisely two, can preferably be accommodated by the conduit element. The welding wire cores can be introduced into the conduit element via a first end of the conduit element, wherein, in each case, the welding wire that is fed into the welding wire cores can be fed via a second end of the conduit element out of the conduit element and preferably out of the appertaining welding wire core. The welding wire that is fed out of the conduit element via the second end of the conduit element can preferably be fed in the direction of the feeding means or it can enter the feeding means while in the first orientation. This embodiment is advantageous since the conduit element can supply several welding wires in a compact and protected manner.

According to a preferred embodiment of the present invention, just one welding wire can be arranged between the feeding means and the contact tip. This embodiment is advantageous since only precisely the material of this one welding wire can be employed to create the weld seam. As a result, this advantageously ensures that the quality of the weld seam at the appertaining site has the desired material properties.

According to another preferred embodiment, at least one stop is provided in order to restrict the penetration depth of the welding wire core into the conduit element of the present invention. This embodiment is advantageous since, owing to the stop, a relative position can be prescribed between the appertaining welding wire core and the conduit element.

According to another preferred embodiment of the present invention, the stop is part of an association means. In this context, the association means preferably forms at least two or precisely two axial openings. The end of a welding wire core can preferably be arranged in a defined manner in front of an opening, wherein the welding wire that is fed through this welding wire core can be fed via the opening, and the end of another welding wire core can be arranged in a defined manner in front of another opening. The other welding wire that is fed through the other welding wire core can preferably be fed through the other opening. The association means preferably forms an association component by means of which the welding wire core can be associated with the one opening, while the other welding wire core can be associated with the other opening. This embodiment is advantageous since, as a result, the exiting direction of the welding wire out of the appertaining welding wire core can be prescribed, as a result of which mechanical stresses caused by undesired elastic and/or plastic deformations of the welding wire can be reduced or prescribed in a defined manner or else prevented.

An alignment means is provided according to another preferred embodiment of the present invention. Here, the nozzle holder is preferably connected at least indirectly to the alignment means, wherein a welding wire can be fed through the alignment means all the way into the nozzle holder, especially into the contact tip. The alignment means preferably has an input component and/or an output component, wherein current and/or working gas can be fed into the alignment means via the input component and/or the fed-in current or the fed-in working gas can be fed into the nozzle holder via the output component. The output component here can preferably be rotated, especially rotatably mounted, relative to the input component. This embodiment is advantageous since it creates a highly space-saving or compact manner to feed in current and/or gas.

According to another preferred embodiment of the present invention, the feeding means has at least one base part and one replaceable part. Here, the replaceable part preferably has the especially conical feeding surface. This embodiment is advantageous since the replaceable part can be replaced, especially after it has become worn out. Here, the wear and tear can result from the fact that, when one end of the welding wire is introduced into the feeding means, it slides or grinds or scrapes along the preferably conical or slanted feeding surface.

According to another preferred embodiment of the present invention, several source means are provided, especially at least two or precisely two, wherein each source means has a current source, a working-gas source and/or a welding wire source, wherein each source means is connected to one or at least one supply means via a connecting means. Preferably, the welding wires supplied by the source means differ, especially in terms of their material composition and/or in terms of one or more geometric properties. In addition or as an alternative, the working gases supplied by the appertaining working gas sources can differ, especially in terms of their composition and/or density. In addition or as an alternative, the strength of the current that is generated by the various current sources can differ. This embodiment is advantageous since the welding wires of the various source means can be fed via the same conduit element and the gas or working gas associated with the appertaining welding wire can be transported or conveyed via one conduit that differs from the conduit through which the gas or working gas associated with the other welding wire can be fed or conveyed. In this manner, an advantageous welding wire feed of both or of all of the welding wires is made possible, without this causing an undesired mixing of the gases or working gases.

Moreover, the present invention can relate to a method for operating a welding device that has a separating means according to the invention.

Furthermore, the present invention can relate to a conduit element or to a welding device having such a conduit element.

Preferably, the welding device that has a conduit element as set forth in the present invention likewise has at least one or precisely one contact tip and/or at least one or precisely one nozzle holder. Here, the contact tip can preferably have an elongated feeding means for feeding a welding wire. Moreover, the contact tip can preferably be arranged on or in the nozzle holder.

According to another preferred embodiment of the present invention, the welding device has an elongated conduit element. A plurality of welding wire cores, especially two or precisely two, can preferably be accommodated by the conduit element. The welding wire cores can be introduced into the conduit element via a first end of the conduit element, wherein, in each case, the welding wire that is fed into the welding wire cores can be fed via a second end of the conduit element out of the conduit element and preferably out of the appertaining welding wire core. The welding wire that is fed out of the conduit element via the second end of the conduit element can preferably be fed in the direction of a feeding means or it can enter the feeding means while in the first orientation. This solution is advantageous since the conduit element can supply several welding wires in a compact and protected manner.

According to another preferred embodiment of the present invention, the welding device comprises a feeding means for moving the welding wire, especially a first welding wire, out of a first source means and/or a second welding wire out of a second source means, out of a first orientation and into a second orientation. While the welding wire is in the first orientation, it can be fed to the feeding means, and while the welding wire is in the second orientation, it can be fed out of the feeding means, in particular in the direction of the nozzle holder. In this context, the feeding means preferably has a preferably conical or slanted feeding surface. This embodiment is advantageous since, as a result, the welding wire can then be moved, especially automatically, into an orientation with a defined alignment.

Preferably, the feeding means has an opening through which the welding wire can be fed. Preferably, the diameter of the opening is smaller than the sum of the diameters of the welding wires that have been supplied by the source means.

According to a preferred embodiment of the present invention, just one welding wire can be arranged between the feeding means and the contact tip. This embodiment is advantageous since only precisely the material of this one welding wire can be employed to create the weld seam. As a result, this advantageously ensures that the quality of the weld seam at the appertaining site has the desired material properties.

According to another preferred embodiment, at least one stop is provided in order to restrict the penetration depth of the welding wire core into the conduit element of the present invention. This embodiment is advantageous since, owing to the stop, a relative position can be prescribed between the appertaining welding wire core and the conduit element.

According to another preferred embodiment of the present invention, the stop is part of an association means. In this context, the association means preferably forms at least two or precisely two axial openings. The end of a welding wire core can preferably be arranged in a defined manner in front of an opening, wherein the welding wire that is fed through this welding wire core can be fed via the opening, and the end of another welding wire core can be arranged in a defined manner in front of another opening. The other welding wire that is fed through the other welding wire core can preferably be fed through the other opening. The association means preferably forms an association component by means of which the welding wire core can be associated with the one opening, while the other welding wire core can be associated with the other opening. This embodiment is advantageous since, as a result, the exiting direction of the welding wire out of the appertaining welding wire core can be prescribed, as a result of which mechanical stresses caused by undesired elastic and/or plastic deformations of the welding wire can be reduced or prescribed in a defined manner or else prevented.

According to another preferred embodiment of the present invention, the feeding means has at least one base part and one replaceable part. Here, the replaceable part preferably has the especially conical feeding surface. This embodiment is advantageous since the replaceable part can be replaced, especially after it has become worn out. Here, the wear and tear can result from the fact that, when one end of the welding wire is introduced into the feeding means, it slides or grinds or scrapes along the preferably conical or slanted feeding surface.

According to another preferred embodiment of the present invention, a separating means is provided. The separating means preferably has at least two or precisely two supply means. Preferably, each supply means can accommodate current, gas and/or welding wire. The welding wires that have been fed via the supply means can preferably be fed out of the separating means via a welding wire discharging means. In addition or as an alternative, the gases fed in via the supply means can be fed out of the separating means via one or more gas outlets. The gas outlets are preferably connected to gas coupling means in order to once again couple the gases into the transport path of the welding wire. The gas coupling means are preferably components of the alignment means, especially of the input component, or of the feeding means or of the association means. According to another preferred embodiment of the present invention, the separating means has several discharging means. The number of discharging means is preferably greater than the number of supply means. This embodiment is advantageous since the gas that is supplied together with an appertaining welding wire can be separated from the welding wire and can thus be conveyed via another path, especially another conduit or conduit connection, especially a pipe or a tube, in the direction of the contact tip.

According to another preferred embodiment of the present invention, several source means are provided, especially at least two or precisely two, wherein each source means has a current source, a working-gas source and/or a welding wire source, wherein each source means is connected to one or at least one supply means via a connecting means. Preferably, the welding wires supplied by the source means differ, especially in terms of their material composition and/or in terms of one or more geometric properties. In addition or as an alternative, the working gases supplied by the appertaining working gas sources can differ, especially in terms of their composition and/or density. In addition or as an alternative, the strength of the current that is generated by the various current sources can differ. This embodiment is advantageous since the welding wires of the various source means can be fed via the same conduit element and the gas or working gas associated with the appertaining welding wire can be transported or conveyed via one conduit that differs from the conduit through which the gas or working gas associated with the other welding wire can be fed or conveyed. In this manner, an advantageous welding wire feed of both or of all of the welding wires is made possible, without this causing an undesired mixing of the gases or working gases.

Moreover, the present invention can relate to a method for operating a welding device that has a conduit element according to the invention.

Furthermore, the present invention can relate to an association means or to a welding device having such an association means.

Preferably, the welding device that has an association means as set forth in the present invention likewise has at least one or precisely one contact tip and/or at least one or precisely one nozzle holder. Here, the contact tip can preferably have an elongated feeding means for feeding a welding wire. Moreover, the contact tip can preferably be arranged on or in the nozzle holder.

The association means preferably forms a stop, especially to restrict the penetration depth of a welding wire core or of several welding wire cores into a conduit element. Here, the association means preferably forms at least two or precisely two axial openings or it has at least two or precisely two axial openings that are preferably formed next to each other, that is to say, they are preferably situated in one plane. The end of a welding wire core can preferably be arranged in a defined manner in front of an opening, especially in front of one of these openings, wherein the welding wire that is fed through this welding wire core can be fed via the opening, and the end of another welding wire core can be arranged in a defined manner in front of another opening. The other welding wire that is fed through the other welding wire core can preferably be fed through the other opening. The association means preferably forms an association component by means of which the welding wire core can be associated with the one opening, while the other welding wire core can be associated with the other opening. This solution is advantageous since, as a result, the exiting direction of the welding wire out of the appertaining welding wire core can be prescribed, as a result of which mechanical stresses caused by undesired elastic and/or plastic deformations of the welding wire can be reduced or prescribed in a defined manner or else prevented. This solution is also advantageous since, owing to the stop, a relative position can be prescribed between the appertaining welding wire core and the conduit element.

According to another preferred embodiment of the present invention, the welding device has an elongated conduit element. A plurality of welding wire cores, especially two or precisely two, can preferably be accommodated by the conduit element. The welding wire cores can be introduced into the conduit element via a first end of the conduit element, wherein, in each case, the welding wire that is fed into the welding wire cores can be fed via a second end of the conduit element out of the conduit element and preferably out of the appertaining welding wire core. The welding wire that is fed out of the conduit element via the second end of the conduit element can preferably be fed in the direction of the feeding means or it can enter the feeding means while in the first orientation. This embodiment is advantageous since the conduit element can supply several welding wires in a compact and protected manner.

According to another preferred embodiment of the present invention, the welding device comprises a feeding means for moving the welding wire, especially a first welding wire, out of a first source means and/or a second welding wire out of a second source means, out of a first orientation and into a second orientation. While the welding wire is in the first orientation, it can be fed to the feeding means, and while the welding wire is in the second orientation, it can be fed out of the feeding means, in particular in the direction of the nozzle holder. In this context, the feeding means preferably has a preferably conical or slanted feeding surface. This embodiment is advantageous since, as a result, the welding wire can then be moved, especially automatically, into an orientation with a defined alignment.

Preferably, the feeding means has an opening through which the welding wire can be fed. Preferably, the diameter of the opening is smaller than the sum of the diameters of the welding wires that have been supplied by the source means.

According to a preferred embodiment of the present invention, just one welding wire can be arranged between the feeding means and the contact tip. This embodiment is advantageous since only precisely the material of this one welding wire can be employed to create the weld seam. As a result, this advantageously ensures that the quality of the weld seam at the appertaining site has the desired material properties.

According to another preferred embodiment of the present invention, the feeding means has at least one base part and one replaceable part. Here, the replaceable part preferably has the especially conical feeding surface. This embodiment is advantageous since the replaceable part can be replaced, especially after it has become worn out. Here, the wear and tear can result from the fact that, when one end of the welding wire is introduced into the feeding means, it slides or grinds or scrapes along the preferably conical or slanted feeding surface.

According to another preferred embodiment of the present invention, a separating means is provided. The separating means preferably has at least two or precisely two supply means. Preferably, each supply means can accommodate current, gas and/or welding wire. The welding wires that have been fed via the supply means can preferably be fed out of the separating means via a welding wire discharging means. In addition or as an alternative, the gases fed in via the supply means can be fed out of the separating means via one or more gas outlets. The gas outlets are preferably connected to gas coupling means in order to once again couple the gases into the transport path of the welding wire. The gas coupling means are preferably components of the alignment means, especially of the input component, or of the feeding means or of the association means. According to another preferred embodiment of the present invention, the separating means has several discharging means. The number of discharging means is preferably greater than the number of supply means. This embodiment is advantageous since the gas that is supplied together with an appertaining welding wire can be separated from the welding wire and can thus be conveyed via another path, especially another conduit or conduit connection, especially a pipe or a tube, in the direction of the contact tip.

According to another preferred embodiment of the present invention, several source means are provided, especially at least two or precisely two, wherein each source means has a current source, a working-gas source and/or a welding wire source, wherein each source means is connected to one or at least one supply means via a connecting means. Preferably, the welding wires supplied by the source means differ, especially in terms of their material composition and/or in terms of one or more geometric properties. In addition or as an alternative, the working gases supplied by the appertaining working gas sources can differ, especially in terms of their composition and/or density. In addition or as an alternative, the strength of the current that is generated by the various current sources can differ. This embodiment is advantageous since the welding wires of the various source means can be fed via the same conduit element and the gas or working gas associated with the appertaining welding wire can be transported or conveyed via one conduit that differs from the conduit through which the gas or working gas associated with the other welding wire can be fed or conveyed. In this manner, an advantageous welding wire feed of both or of all of the welding wires is made possible, without this causing an undesired mixing of the gases or working gases.

Moreover, the present invention can relate to a method for operating a welding device that has an association means according to the invention.

Here, it is also possible for the device according to the invention to form a component of a welding device. Preferably, this component has at least the means listed below and the connections that exist between these means, namely, feeding means, separating means and conduit element. Here, the conduit element preferably connects the separating means and the feeding means. In the working direction (feeding direction of the welding wire from the source means to the contact tip), first comes the separating means, followed by the conduit element and then by the feeding means.

Moreover, each welding device disclosed herein as well as combinations thereof can be configured with a robot arm, especially a multiaxial robot arm, especially with a robot arm with a 4-axial or more than 4-axial or precisely 4-axial robot arm, or a 5-axial or more than 5-axial or precisely 5-axial robot arm, or a 6-axial or more than 6-axial or precisely 6-axial robot arm, or a 7-axial or more than 7-axial or precisely 7-axial robot arm, or a 15-axial or more than 15-axial or precisely 15-axial robot arm.

Consequently, the present disclosure can likewise comprise a multiaxial robot arm.

Here, the multiaxial robot arm has at least one welding device as disclosed in the overall disclosure content of this patent specification. Preferably, at least one component of the welding device, especially the feeding means and/or a part of the conduit element, especially the association means, runs in certain sections in a hollow shaft of the multiaxial robot arm or of the orbital welding robot.

Moreover, the present invention can relate to a method for operating a welding device, or for operating an orbital welding robot. Here, the method preferably comprises at least the following steps:

feeding a first welding wire in the working direction and feeding a first working gas out of a first source means to a contact tip;

moving the welding wire counter to the working direction in order to open up a welding wire path, especially in an area between the feeding means and the contact tip;

feeding a second welding wire in the working direction as well as a second working gas out of a second source means to the contact tip via the same welding wire path, especially in an area between the feeding means and the contact tip;

wherein the first welding wire and the second welding wire are conveyed on separate welding wire paths from the source means to the feeding means.

According to another preferred embodiment of the present invention, in each case, the working gas fed in from the appertaining source means is fed together with the appertaining welding wire via a connecting means to a separating means. Preferably, always or most of the time, working gas and welding wire is fed only from one or precisely one source means to the separating means. The separating means preferably feeds the working gas into a gas discharging means, especially into a gas conduit, and it feeds the welding wire onto a welding wire path, especially a conduit, especially a pipe or tube, that is separate from the gas conduit.

According to another preferred embodiment of the present invention, the gas conduit is connected to the feeding means and the working gas that is fed via the gas conduit is preferably coupled into the transport path of the welding wire by the feeding means in order to flow around the welding wire that is being conveyed by the feeding means. The separating means and the feeding means are especially preferably in a fluid connection with each other via two or at least two or precisely two gas conduits. This is advantageous since the gas conduits can be flushed in order to prevent gas mixtures.

Consequently, the present disclosure can likewise comprise an orbital welding robot. In this context, the orbital welding robot has at least one welding device disclosed in the overall disclosure content of this patent specification. Preferably, at least one component of the particular welding device according to the invention, especially the feeding means, and/or a part of the conduit element and/or the alignment means and/or the separating means and/or the association means, runs in the area of a frame of the orbital welding robot or in the area of a feed belt, wherein preferably, the feed belt is or can be secured around a pipe. In this context, the feed belt can be an extra component and is thus not necessarily part of the orbital welding robot. Preferably, the orbital welding robot has a holding means to hold the contact tip, especially to position it in a defined manner. Especially preferably, the orbital welding robot has a moving means to move the contact tip relative to the frame part of the orbital welding robot, especially to impart an oscillating movement and/or to move, especially to swivel, in defined orientations, especially angles, relative to the frame of the orbital welding robot.

Additional advantages, objectives and properties of the present invention are explained on the basis of the description below of the accompanying drawings in which, by way of example, welding devices according to the invention are depicted. Elements of the devices and method steps according to the invention which correspond in the figures, at least essentially in terms of their function, can be designated with the same reference numerals, wherein these components or elements or steps do not have to be numbered or elucidated in all of the figures. Below, the invention will be described purely by way of an example with reference to the accompanying figures. In this context, all of the described and/or depicted features, either on their own or in any meaningful combination, constitute the subject matter of the present invention, also irrespective of their compilation in the claims or in the claims to which they refer.

BRIEF DESCRIPTION OF THE DRAWINGS

The figures show the following:
FIGS. 2, 3a-f depictions of an example of a feeding means according to the invention;
FIG. 4a-e depictions of an example of an association means according to the invention;
FIG. 5a-c depictions of an example of a conduit element according to the invention;
FIGS. 6, 7a-f depictions of an example of a separating means according to the invention.

DETAILED DESCRIPTION

Figure 1:
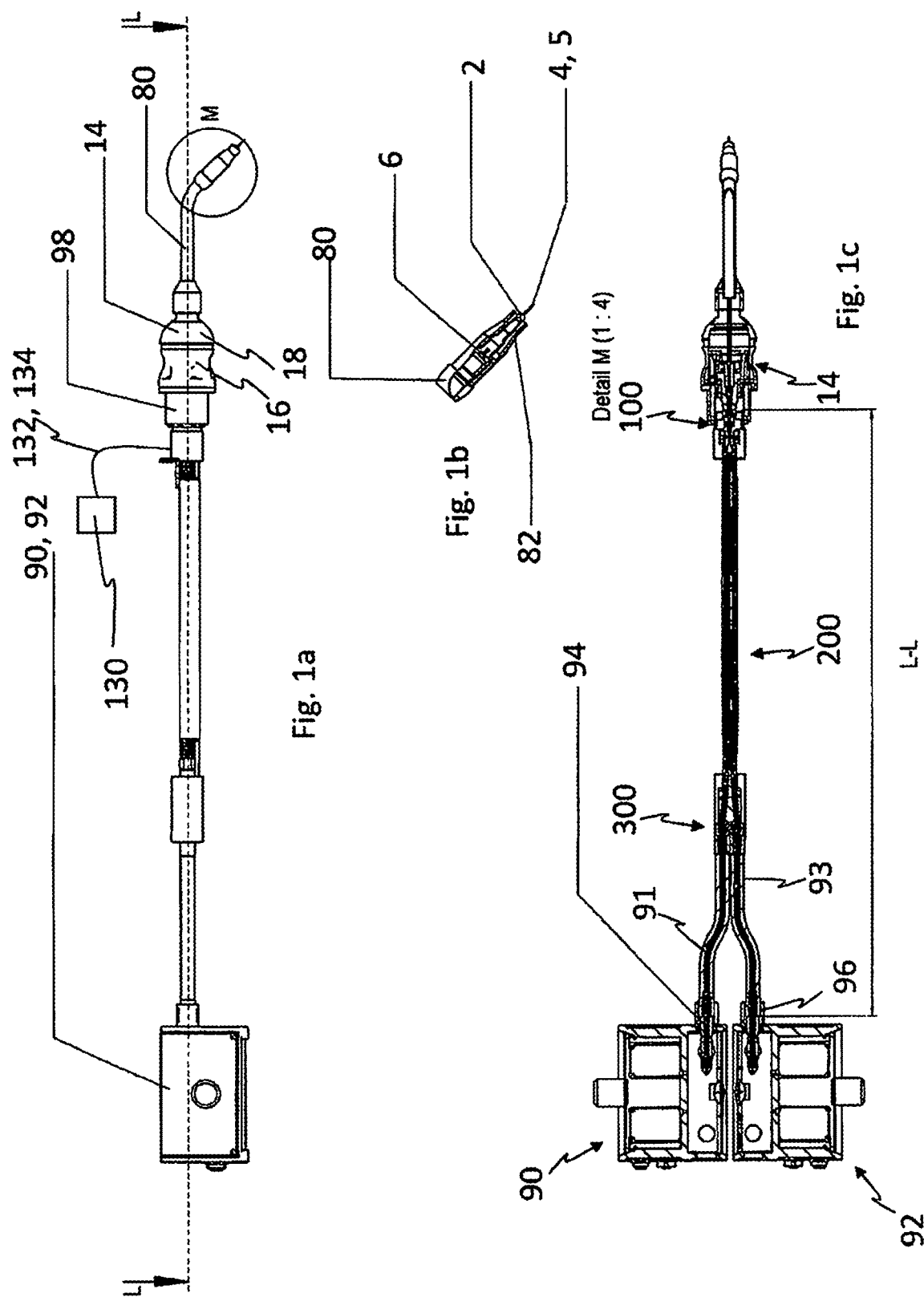
FIG. 1a-c components of a welding device according to the invention.
Figure 2:
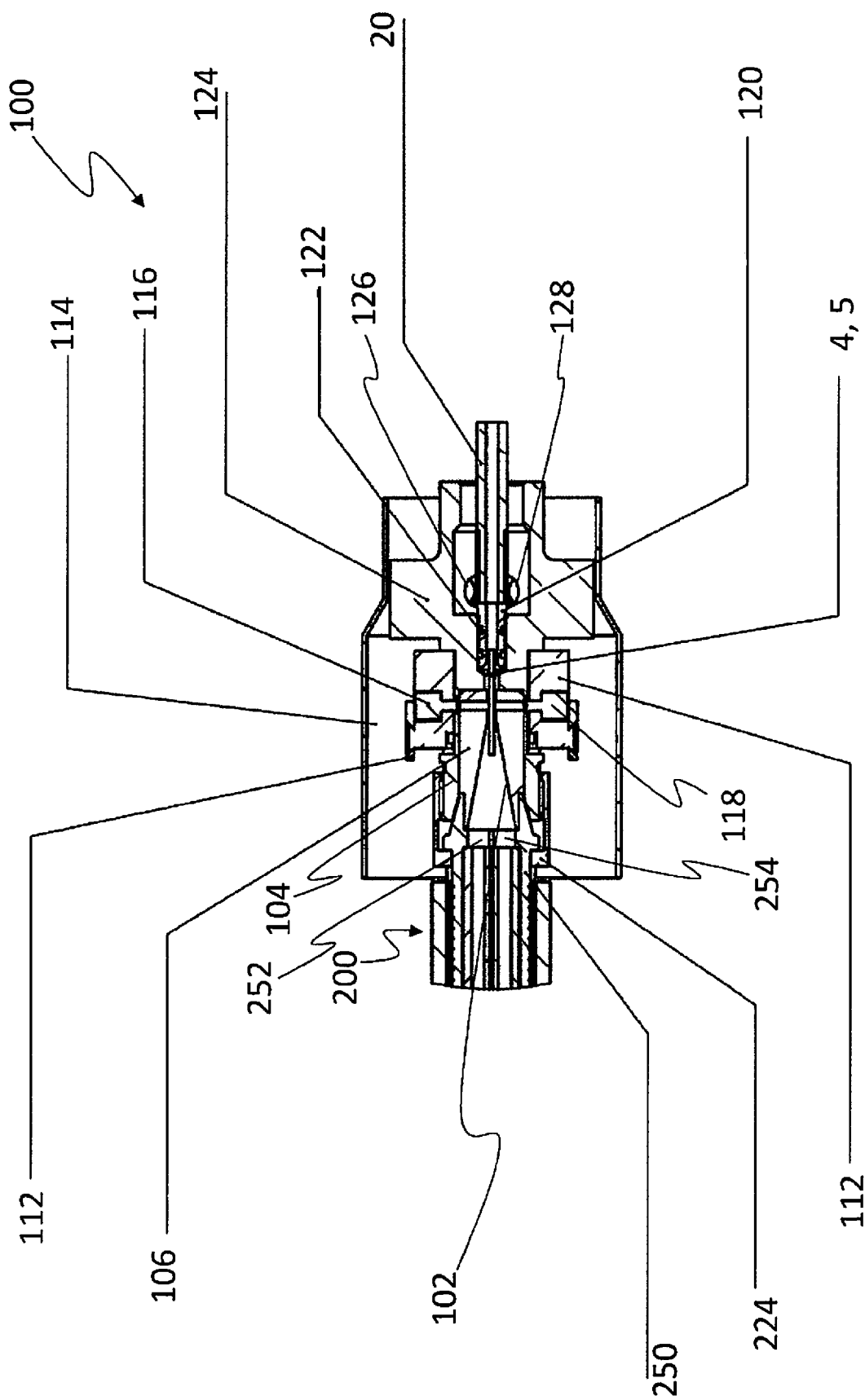
Figure 7E:
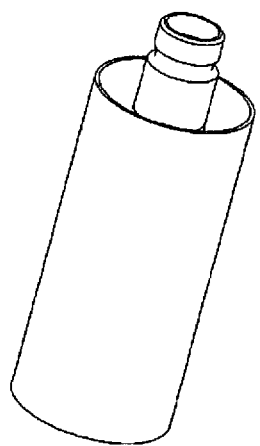
Figure 7F:
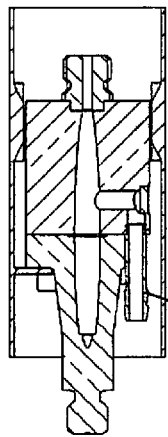
Figure 7D:
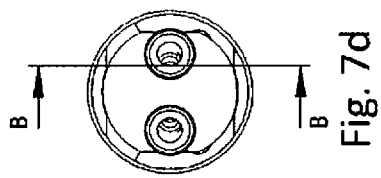
Figure 7A:
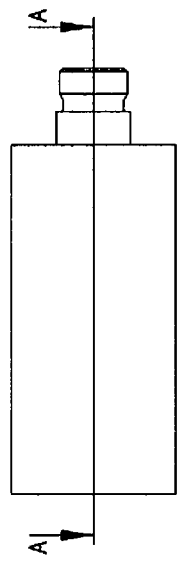
Figure 7B:
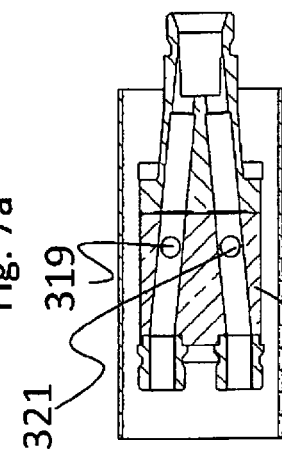
Figure 7C:
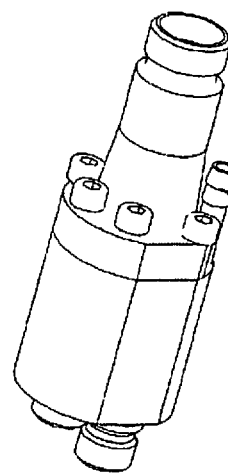

FIG. 1 shows a welding device 1. This welding device preferably has at least one contact tip 2. The contact tip 2 preferably has an elongated feeding means for feeding a welding wire 4. Moreover, the welding device can have a nozzle holder 6. The contact tip 2 can be arranged on or in the nozzle holder 6. Furthermore, a feeding means 100 for moving the welding wire 4 out of a first orientation and into a second orientation can be provided. The welding wire 4 can be fed into the feeding means 100 while in the first orientation and it can be fed out of the feeding means 100 while in the second orientation, in particular, the welding wire can be fed in the direction of the nozzle holder 6. The feeding means 100 can have a preferably conical feeding surface 102, which is preferably hardened. Moreover, in addition or as an alternative, an elongated conduit element 200 can be provided, wherein a plurality of welding wire cores 8, 10 can be accommodated by the conduit element 200. The welding wire cores 8, 10 can be introduced into the conduit element 200 via a first end 202 of the conduit element, wherein the welding wires 4, 5 that are fed into the welding wire cores 8, 10 can be fed out of the conduit element 200 via a second end 204 of the conduit element. The welding wire 4, 5 that is fed out of the conduit element 200 via the second end 204 of the conduit element can be fed in the direction of the feeding means 100, in particular, it can enter the feeding means 100 while in the first orientation.

Moreover, an alignment means 14 can be provided, wherein the nozzle holder 6 is connected at least indirectly to the alignment means 14. A welding wire 4, 5 can be fed all the way through the alignment means 14 into the nozzle holder 6, especially into the contact tip 2. The alignment means 14 preferably has an input component 16 and an output component 18, wherein current and/or working gas can be fed into the alignment means 14 via the input component 16 and wherein the fed-in current or the fed-in working gas can be fed into the nozzle holder 6 via the output component 18.

FIGS. 2 and 3a-3f show examples of a feeding means 100. The feeding means 100 defines a transport path for transporting a welding wire 4, 5, in particular in the direction of the contact tip 2, or else it at least partially forms such a transport path.

Preferably, an electrically insulating bushing 114 is provided, especially consisting of a polymer material or containing a polymer material. The bushing 114 preferably overlaps the feeding means 100 in the circumferential direction, at least partially and especially preferably mostly or completely. The bushing insulates at least 500V or 1000V or 2000V.

Moreover, the feeding means 100 can have optical waveguide heads 116, 118. One optical waveguide head 116 is or can be arranged at one side of the transport path or adjacent to it at a distance while the other optical waveguide head 118 is or can be arranged at the other side of the transport path or opposite from the first optical waveguide head 116. In this context, the first optical waveguide head 116 and the second optical waveguide head 118 are aligned relative to each other so as to communicate. This is advantageous since, in this manner, for example, the presence of a welding wire 4, 5, can be ascertained. Preferably, the optical waveguide heads 116, 118 are connected to a sensor or to a sensor means 130 via optical waveguides 132, 134.

Preferably, a sensor array is formed or a sensor array is provided. A sensor array is advantageous since, in addition to ascertaining the presence, it also allows the advancing rate of the welding wire that has been newly introduced into the feeding means 100 to be determined. Furthermore or as an alternative, the optical analysis of the welding wire by means of the sensor means 130 can detect surface properties, especially the purity, defects and/or impurities. The optical waveguide heads 116, 118 are preferably arranged or aligned at an angle of 90° relative to the wire feed or to the transport path. In this context, an optical waveguide head 116 serves as the transmitter and an optical waveguide head 118 serves as a receiver. Thus, the sensor means 130 couples preferably defined light waves into the first optical waveguide head 116 while the other optical waveguide head 118 receives these emitted light waves or parts of these emitted light waves and conveys them to the sensor means 130, especially for purposes of analysis.

In addition or as an alternative, the feeding means 100 can serve to move the welding wire 4 out of a first orientation and into a second orientation. Here, the welding wire 4, 5 is fed to the feeding means 100 while in the first orientation and out of the feeding means 100 while in the second orientation, in particular in the direction of the nozzle holder 6. The feeding means 100 preferably has a conical feeding surface 102. The feeding surface 102 can be part of a replaceable part 106. The replaceable part 106 can be joined to a base part 104 of the feeding means 100, for example, by means of a positive fit and/or a non-positive fit or an integrally bonded connection, especially so as to be detachable. The replaceable part 106 can comprise a different material or can consist of a material differs from that of the base part 104. The other material is preferably steel, especially hardened steel, or a ceramic material. The feeding surface 102 forms an entry area 136 and an exit area 138. In this context, the exit area 138 is aligned closer to the contact tip 2 in the working direction or to the welding site than the entry area 136 is. The smallest diameter of the entry area 136 is preferably larger than the smallest diameter of the exit area 138 by a factor of 1.3 or 1.5 or 1.8 or 2 of 2.5 or 3 or 4 or 5.

In addition or as an alternative, the feeding means 100 has working gas connections, especially a first gas coupling means 108 and a second gas coupling means 110. The first gas coupling means 108 serves to establish a connection to the first gas discharging means 226, which receives working gas via the first gas outlet 320 of the separating means 300. The second gas coupling means 110 serves to establish a connection to the second gas discharging means 228, which receives working gas via the first gas outlet 322 of the separating means 300.

The working gas connections 108, 110 are preferably formed or arranged on a mass element 140. The mass element 140 preferably makes up at least 10% and especially preferably at least 20% or at least 30% or at least 40% or at least 50% or at least 60% or at least 70% of the mass of the feeding means 100. Here, the mass element 140 preferably forms a ring-like element, wherein the thickness of the ring extends in the axial direction or in the transport direction of the welding wire inside the feeding means 100. The ring can have a thickness of more than 5 mm or more than 8 mm or more than 10 mm or more than 12 mm. Especially preferably, the welding wire transport path runs through the radial center of the ring. The ring 140 preferably has two bores 142, 144 oriented in the direction of the center of the ring. Here, starting from an outer circumferential surface 146 of the ring 140, the bores 142, 144 run in the direction of the center of the ring 140. The first gas coupling means 108 is preferably oriented at a slant relative to the first bore 142, especially at an angle of 90°. The first gas coupling means 108 is connected to the first bore 142 so as to communicate (for purposes of a working-gas exchange). Moreover, starting from its circumferential surface, especially extending in the radial direction, the ring 140 can have one ore more recesses 146, 148. The recesses 146, 148 preferably extend over the entire thickness of the ring 140. Preferably, the recess 146 extends or the recesses 146, 148 extend in the radial direction or in the direction of the center of the ring by at least or up to 3 mm or at least or up to 4 mm or at least or up to 5 mm or at least or up to 6 mm or at least or up to 7 mm or at least or up to 8 mm or at least or up to 9 mm or at least or up to 10 mm or at least or up to 12 mm or at least or up to 15 mm. The clearance of the recess 146, 148 is preferably at least or up to 1 mm or at least or up to 1.5 mm or at least or up to 2 mm or at least or up to 2.5 mm or at least or up to 3 mm or up to 3.5 mm or at least or up to 4 mm or at least or up to 4.5 mm or at least or up to 5 mm. In this context, the clearance describes the distance between the flat surface portions 150, 152 of a recess 146, 148 relative to each other.

The second gas coupling means 110 is preferably oriented at a slant relative to the second bore (not shown here), especially at an angle of 90°. The second gas coupling means 110 is connected to the second bore so as to communicate (for purposes of a working-gas exchange).

Preferably, the feeding means 100 has a feeding surface 102 and optical waveguide heads 116, 118. The optical waveguide heads 116 are preferably aligned closer to the contact tip 2 or to the welding site than the feeding surface 102 is.

Preferably, the feeding means 100 has a feeding surface 102 and a mass element 140. The mass element is preferably aligned closer to the contact tip 2 or to the welding site than the feeding surface 102 is.

Preferably, the feeding means 100 has an optical waveguide head or several optical waveguide heads 116, 118 and a mass element 140. The mass element 140 is preferably aligned closer to the contact tip 2 or to the welding site than the optical waveguide head or the optical waveguide heads 116, 118 is.

The feeding means preferably consists mostly or completely (in terms of mass) of a metal material or of a material combination, especially of copper or brass.

FIG. 4 shows an association means 250 for accommodating and aligning the elongated feeding means, especially the welding wire cores 8, 10, in a defined manner. Here, the association means 250 preferably has at least one entry opening 266 and one outlet opening 278. Preferably, the entry opening 266 is at a distance from the outlet opening 278 in the axial direction. A wall 280 is especially preferably arranged or formed between the entry opening 266 and the outlet opening 278, wherein said wall 280 has two or at least two or precisely two passage openings 252, 254, wherein the passage openings 252, 254 preferably have the same diameter; preferably, the passage openings 252, 254 each have feeding bevels 262, 264 extending in the direction of the entry opening 266. An outlet space 258 is preferably formed between the passage openings 252, 254 and the outlet opening 278. An interior space 268 is preferably formed between the passage openings 252, 254 and the entry opening surface 270. The interior space 268 preferably extends further in the axial direction than the outlet space 258 does.

The outlet space 258 preferably has a continuous, especially cylindrical, shape and/or the interior space 268 has a continuous shape, preferably in certain sections or only in certain sections, especially for the most part (in terms of length). The interior space 268 preferably extends further in the widthwise direction 274 than it does in the heightwise direction 272. In the widthwise direction 274, the interior space 268 preferably extends at least by a factor of 1.3 or 1.5 or 1.7 or 1.9 or 2 or 2.5 further than in the heightwise direction 272. The interior space 268, at least in certain sections and preferably for the most part or completely, forms a cross sectional surface (orthogonal to the axial direction) that diverges from a round shape. Preferably, the outlet space 258, at least in certain sections and preferably for the most part or completely, forms a cross sectional surface (orthogonal to the axial direction) that preferably corresponds to a circular shape. Moreover, the association means can be made of metal, especially brass or copper or steel or aluminum or a noble metal. As an alternative, the association means can be made of a ceramic material, a composite material or a polymer material or a material combination of the cited materials.

Moreover, the association means 250 can have a circumferential collar 276. The collar 276 preferably extends along the outer surface of the association means 250 or it forms this outer surface 282. The interior space 268 is thus delimited by the inner surface 284. The collar 276 preferably overlaps the openings 252, 254 in the radial direction. However, as an alternative, it is possible that the collar 276 is not present or that it does not overlap in the radial direction at all or else only partially. The outer surface 282 preferably has a conical configuration in the area in which it overlaps the outlet space 258. The outer surface 282 preferably has a cylindrical configuration in the area in which it overlaps the interior space 268 wherein it is possible for the outer surface 282 to have a thread or ridges in this area, preferably in certain sections.

The association means 250 is advantageous since it "blindly" brings about a defined association and alignment of feeding means 10, 11.

The association means 250 can especially preferably be part of a conduit element 200, especially for accommodating welding wire cores 10, 11 to feed welding wire 4, 5.

FIGS. 5a-c show examples of conduit elements 200.

The conduit element 200 preferably has a conduit space 236 for accommodating a plurality of, especially two or precisely two or at least two, welding wire cores 8, 10.

The conduit element 200 preferably has a first end 232 that can preferably be connected to a separating means 300. In addition or as an alternative, the conduit element 200 has a second end 234 that can preferably be connected to a feeding means 100.

A gas discharging means 226 or several gas discharging means 226, 228 can be arranged on the conduit element 200, for instance, via a preferably insulating jacket or tube or band. The first gas discharging means 226 preferably has a coupling connection 227, wherein the coupling connection 227 is especially preferably fitted with a non-return valve or it has a non-return valve. The second gas discharging means 228 preferably has a coupling connection 229, wherein the coupling connection 229 is especially preferably fitted with a non-return valve or it has a non-return valve. As an alternative, it is also possible for the non-return valve to also be provided (for each gas discharging means 226, 228) when the gas discharging means does not have a coupling connection but rather is configured as a continuing conduit, especially a pipe or a tube. As an alternative, it is likewise possible for the appertaining gas discharging means to each have at least one or precisely one coupling connection and a non-return valve, wherein the non-return valve and the coupling connection can be configured separately from each other.

Preferably, the conduit element 200 can accommodate welding wire cores 8, 10 that are each already enclosed by a separating means 300 in certain sections. Therefore, the source means 90, 92 can convey welding wires 4, 5 through the welding wire cores 8, 10 all the way to the second end 234 of the conduit element 200. One of the conveyed welding wires 4 or 5 can then be fed to the feeding means 100. The latter then feeds the welding wire into another or a third welding wire core 20 in a defined manner.

FIGS. 6 and 7a-f show an example of a separating means 300.

The separating means 300 has at least two supply means 302, 304. Each of these supply means 302, 304 can accommodate current, gas and/or welding wire. The media conveyed to the appertaining supply means 302, 304 by the various source means 90, 92 preferably differ from each other.

The first source means 90 preferably supplies a first welding wire and a first working gas and a first current. The second source means 92 preferably supplies a second welding wire and a second working gas and a second current. The first welding wire preferably differs from the second welding wire, especially in terms of its material and/or thickness. In addition or as an alternative, the first gas differs from the second gas, especially in terms of its composition and/or density and/or temperature and/or pressure. In addition or as an alternative, the first current differs from the second current, especially in terms of its strength.

The welding wires 4, 5 fed in via the supply means 302, 304 are preferably fed into welding wire cores 8, 10 and fed out of the separating means 300 via a welding wire discharging means 306, especially a shared conduit section.

The gases fed in via the supply means 302, 304 can be fed out of the separating means 300 via one or more gas outlets 320, 322. The separating means 300 preferably has several discharging means 306, 320, 322, wherein the number of discharging means 306, 320, 322 is greater than the number of supply means 302, 304 is.

The separating means 300 preferably forms an entry part 312 and an exit part 314 or else it has these parts. Here, the entry part 312 can be connected to the first connecting means 91 and to the second connecting means 93, while the exit part 314 can preferably be coupled to the conduit element 200. The entry part 312 also has gas outlets 320, 322.

At least one sealing element 315, 316 or 317 is preferably provided. The sealing element 315, like the sealing element 316, can be configured as a ring seal or as a disk seal. The sealing elements 315, 316 preferably act non-positively onto the outer surfaces of the welding wire cores 8, 10, thereby effectuating a sealing effect, that is to say, they prevent gas from flowing into the exit part 314.

In addition or as an alternative, the exit part 314 can form a gap seal 317, especially in the area of the transition from the separate welding wire core feed 324 into the shared welding wire core feed 326.

The reference numeral 318 designates a bushing, especially for purposes of electric insulation. The bushing 318 preferably insulates at least 500V and especially preferably at least 1000V or 2000V.

Figure 8:
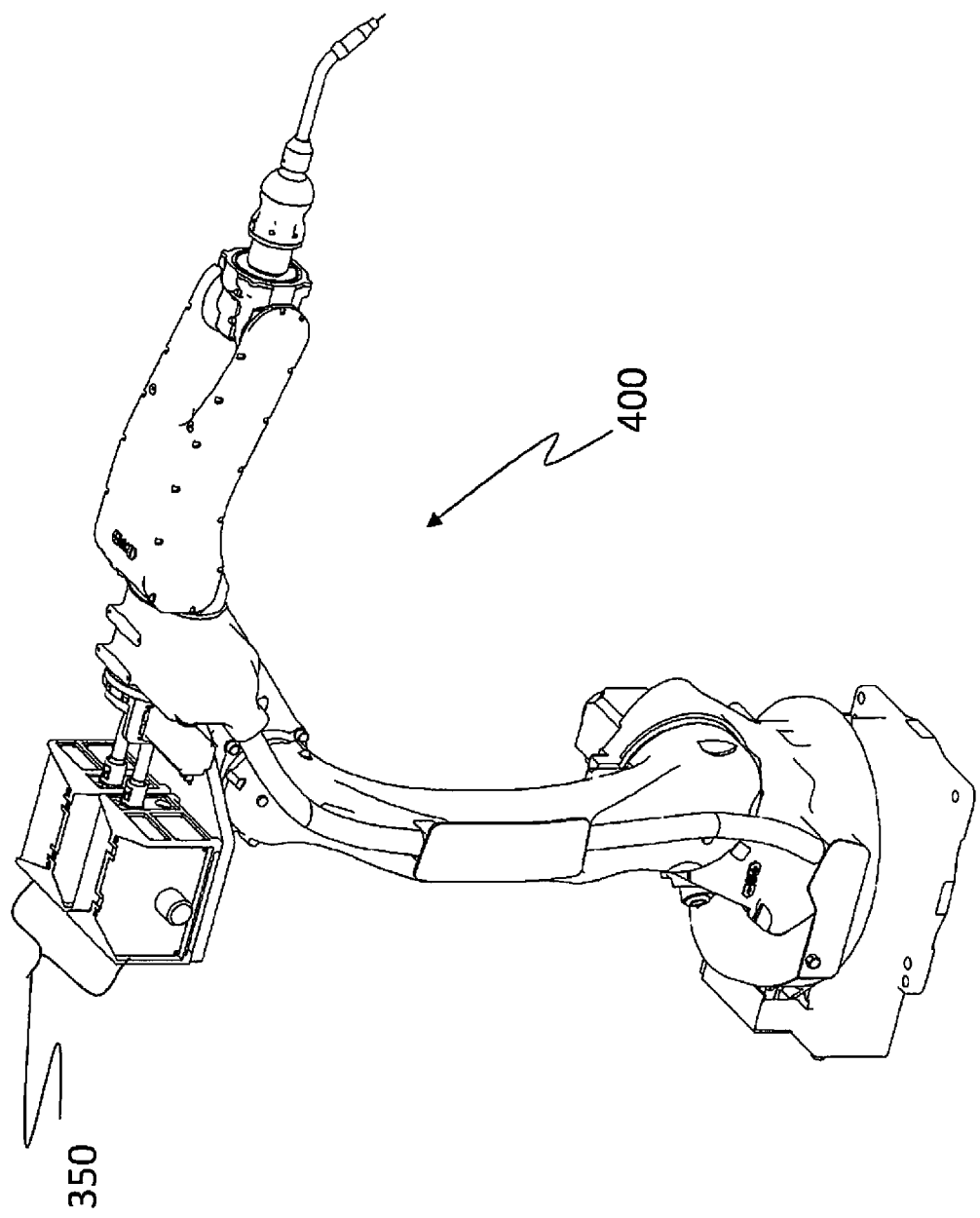
FIG. 8 a depiction of a multiaxial robot arm according to the invention with an integrated welding device according to the invention.

FIG. 8 shows a welding device according to the invention that interacts with a welding robot arm 400 or that has such a welding robot arm 400.

Figure 9:
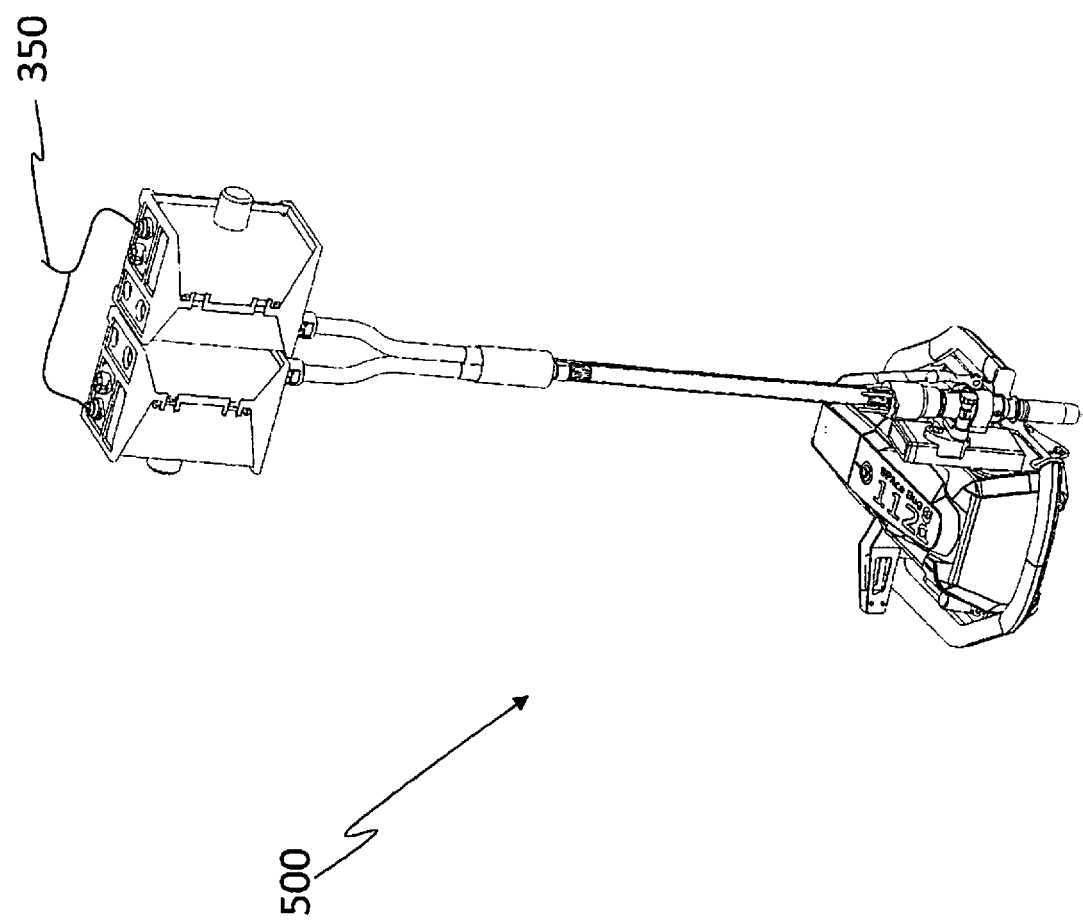
FIG. 9 a depiction of an orbital welding robot according to the invention with an example of an integrated welding device according to the invention.

FIG. 9 shows a welding device according to the invention that interacts with an orbital welding robot or that has such an orbital welding robot.

A compressed air supply means 350 is shown in both figures. Such a compressed air supply can preferably be part of the welding device and can serve to clean the welding device. Here, the compressed air is fed via the same path or the same conduits via which the gas can be fed. Therefore, the compressed air is fed, for example, via conduits 226 and 228, and thus preferably separately from the welding wire, at least in certain sections.

LIST OF REFERENCE NUMERALS 1 welding device
2 contact tip
4 first welding wire
5 second welding wire
6 nozzle holder
7 first welding wire core
9 end of the first welding wire core
10 second welding wire core
11 end of the second welding wire core
14 alignment means
16 input component
18 output component
20 third wire core or third welding wire core
80 torch/torch neck
90 first source means
91 first connecting means
92 second source means
93 second connecting means
94 coupling site for the first source means to the connecting means
96 coupling site for the second source means to the connecting means
98 TCP (Transmission Control Protocol) adapter
100 feeding means
102 feeding surface
104 base part
106 replaceable part
108 first gas coupling means
110 second gas coupling means
112 holding means/holding plate/angled part
114 insulating bushing (front)
116 first optical waveguide head
118 second optical waveguide head
120 wire inlet
122 sealing means (e.g. O-ring)
124 attachment/thickened portion
126 first working gas inlet
128 second working gas inlet
130 sensor
132 first optical waveguide head
134 second optical waveguide head
136 entry area
138 exit area
140 mass element/ring
142 bore
144 soldering introduce
146 first recess
148 second recess
150 first flat surface component
152 second flat surface component
200 conduit element
202 first end of the conduit element
204 second end of the conduit element
206 stop
220 fixation element/cap nut
222 transfer cone (rear)
224 additional fixation element/cap nut
226 first gas discharging means
227 first coupling connection, preferably fitted with a non-return valve
228 second gas discharging means
229 second coupling connection, preferably fitted with a non-return valve
230 electric insulation (>500V)
232 end of the separating means side
234 end of the feeding means side
236 conduit space for accommodating several welding wire cores
250 association means
252 first axial opening
254 second axial opening
256 association component
258 outlet space
260 outer coupling surface, especially conical
262 first feeding bevel to the first opening/bore
264 second feeding bevel to the first opening/bore
266 entry opening
268 interior space between feeding bevels and entry opening
270 entry opening surface slanted relative to the lengthwise extension direction
272 height of the interior space
274 width of the interior space
276 collar
278 outlet opening
280 wall
282 outer surface
284 inner surface
300 separating means
302 first feeding means/threaded connector
304 second feeding means/threaded connector
306 welding wire discharging means/conduit
312 entry part/Y-element rear part
314 exit part/Y-element front part
315 first sealing element/sealing disc
316 second sealing element/sealing disk
317 gap seal
318 bushing/insulation bushing
320 bore to the first gas outlet
322 first gas outlet
321 bore to the second gas outlet
322 second gas outlet
324 separate welding wire core feed
326 shared welding wire core feed
350 compressed air connection or compressed air supply means
400 multiaxial robot arm
500 orbital welding robot

The invention claimed is:

1. A welding device (1), comprising:
   a contact tip (2) from which a first welding wire (4) or a second welding wire (5) selectively emerges,
   a nozzle holder (6) onto which or in which the contact tip (2) is arranged,
   a feeding means (100) having a conical or curved feeding surface (102) for moving the first welding wire (4) or the second welding wire (5) out of a first orientation and into a second orientation said feeding means (100) being configured so that
      the welding wire (4, 5) is fed into the feeding means (100) while in the first orientation and the welding wire (4, 5) is fed out of the feeding means (100) while in the second orientation in the direction of the nozzle holder (6),
   an elongated conduit element (200) configured to accommodate a plurality of welding wire cores (8, 10) that are configured to receive welding wire (4, 5) and that are introduced into the conduit element (200) via a first end (202) of the conduit element; and
   an association means (250) defining at least two axial openings (252, 254) wherein the association means (250) forms an association component (256) so that the first welding wire core (8) of the plurality of welding wire cores can be associated with the one axial opening (252), and the second welding wire core (10) of the plurality of welding wire cores can be associated with the other axial opening (254); and
   at least one stop (206) that is part of the association means (250) and is configured to restrict the penetration depth of the welding wire cores (8, 10) into the conduit element (200),
      wherein an end (9) of the first welding wire core (8) is arranged in front of the axial opening (252),
      wherein the first welding wire (4) that is fed through this first welding wire core (8) is fed via the opening (252), and the end (11) of the second welding wire core (10) is arranged in front of the other opening (254), and wherein the second welding wire (5) that is fed through the second welding wire core (10) is fed through the other opening (254);
      wherein the respective welding wire (4, 5) that is fed into the welding wire cores (8, 10) is fed out of the conduit element (200) via a second end (204) of the conduit element, and wherein the welding wire (4, 5) that is fed out of the conduit element (200) via the second end (204) of the conduit element is fed into the feeding means (100) while in the first orientation.

2. The welding device according to claim 1, wherein only one welding wire (4) is arranged between the feeding means (100) and the contact tip (2).

3. The welding device according to claim 1, further comprising:
   an alignment means (14) having an input component (16) and an output component (18),
   wherein current and/or working gas is fed into the alignment means (14) via the input component (16), and
   wherein the fed-in current or the fed-in working gas is fed into the nozzle holder (6) via the output component (18),
   wherein the nozzle holder (6) is connected at least indirectly to the alignment means (14), and
   wherein the welding wire (4, 5) is fed through the alignment means (14) and into the contact tip (2) of the nozzle holder (6).

4. The welding device according to claim 3, wherein the output component (18) is rotatable relative to the input component (16).

5. The welding device according to claim 1, wherein
   the feeding means (100) has at least one base part (104) and one replaceable part (106),
   wherein the replaceable part (106) has the conical or curved feeding surface (102).

6. The welding device according to claim 1, further comprising:
   a separating means (300) that has at least two supply means (302, 304),
   wherein each supply means (302, 304) is configured to accommodate one or more of current, gas and/or welding wire,
   wherein the welding wires (4, 5) that have been fed via the supply means (302, 304) are fed out of the separating means (300) via a welding wire discharging means (306), and
   wherein the gases fed in via the supply means (302, 304) are fed out of the separating means (300) via one or more gas outlets (320, 322).

7. The welding device according to claim 6, wherein the separating means has several discharging means (306, 320, 322), and wherein the number of discharging means (306, 320, 322) is greater than the number of supply means (302, 304).

8. The welding device according claim 6, wherein the gas outlets (320, 322) are connected to gas coupling means (108, 110) in order to introduce gases into the transport path of the welding wire (4, 5).

9. The welding device according to claim 8, wherein the gas coupling means (108, 110) are components of the alignment means (14), or of the input component (16), or of the feeding means (100) or of the association means (250).

10. The welding device according to claim 1, further comprising:
    a plurality of source means (90, 92),
    wherein each source means (90, 92) has a current source, a working-gas source and a welding wire source, and
    wherein each source means (90, 92) is connected to a supply means (302, 304) via a connecting means (91, 93).

11. A multiaxial robot arm (400), comprising:
    at least one welding device (1) according to claim 1,
    wherein at least a portion of one component of the welding device (1) selected from the group consisting of: the feeding means (100), a part of the conduit element (200), and the association means (250), is held in a hollow shaft of the multiaxial robot arm (400).

12. A method for welding comprising:
    feeding a first welding wire (4) in the working direction and feeding a first working gas out of a first source means (90) to a contact tip (2) of a welding device (1),
    moving the first welding wire (4) counter to the working direction in order to open up a welding wire path in an area between a feeding means (100) and the contact tip (2), and
    feeding a second welding wire (5) in the working direction as well as a second working gas out of a second source means (92) to the contact tip (2) via the same welding wire path in an area between the feeding means (100) and the contact tip (2);
    wherein the first welding wire (4) and the second welding wire (5) are conveyed on separate welding wire paths from the source means (90, 92) to the feeding means (100).

13. The method according to claim 12, wherein
the working gas fed in from the first source means or the second source means (90, 92) is fed together with the appertaining welding wire (4, 5) via a connecting means (91, 93) to a separating means (300),
wherein working gas and welding wire (4, 5) are fed only from precisely one source means (90, 92) to the separating means (300), and
wherein the separating means (300) feeds the working gas into a gas discharging means (226, 228), and feeds the welding wire onto a welding wire path that is separate from the gas discharging means (226, 228).

14. The method according to claim 13, wherein
the gas discharging means (226, 228) is connected to the feeding means (100) and the working gas that is fed via the gas discharging means (226, 228) is coupled into the transport path of the welding wire (4, 5) by the feeding means (100) in order to flow around the welding wire (4, 5) that is conveyed by the feeding means (100).

15. An orbital welding robot (500), comprising at least one welding device (100) according to claim 1,
wherein at least a portion of one component of the welding device (1) selected from the group consisting of: the feeding means (100), a part of the conduit element (200), and the association means (250), is held in a hollow shaft of the orbital welding robot (500), or is held in the contact tip of the nozzle holder (6), and is swivelable relative to a frame of the orbital welding robot (500).

* * * * *